July 9, 1957           R. M. ELLIOTT           2,798,375

APPARATUS FOR TESTING PRESSES

Filed July 25, 1955           4 Sheets-Sheet 1

*Inventor*
Richard M. Elliott
By his Attorney

July 9, 1957 R. M. ELLIOTT 2,798,375
APPARATUS FOR TESTING PRESSES
Filed July 25, 1955 4 Sheets-Sheet 2
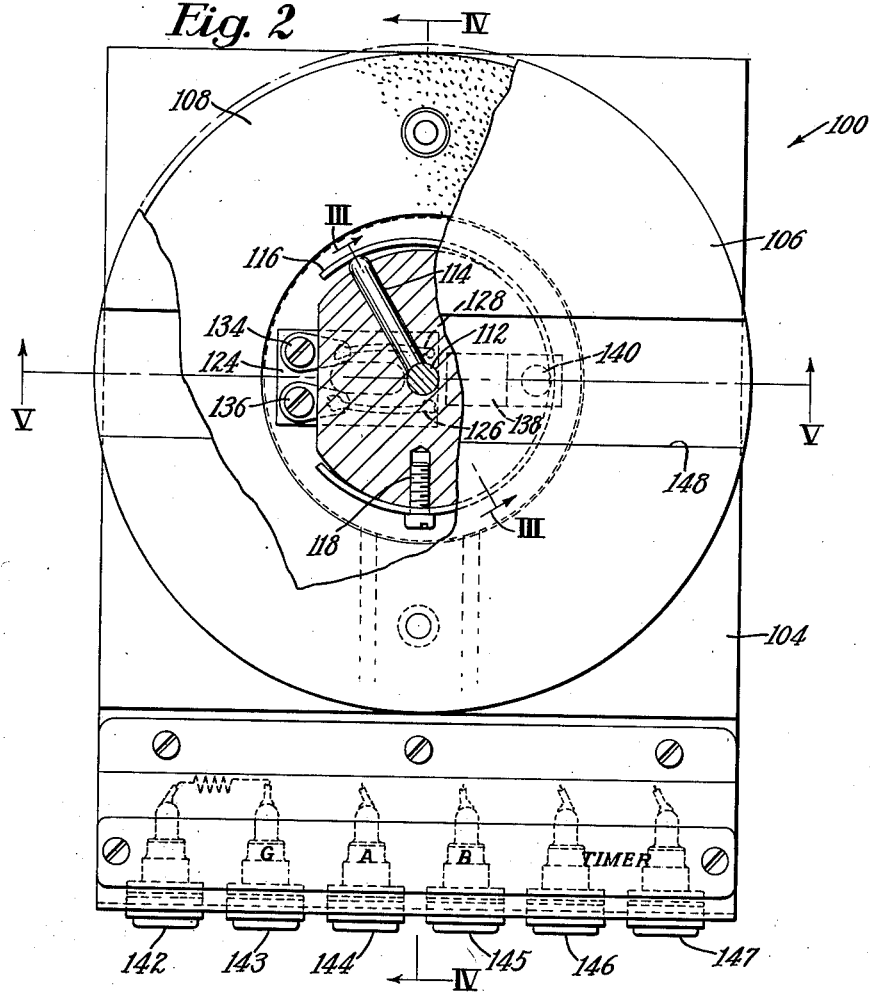
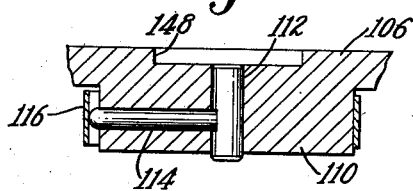
*Inventor*
Richard M. Elliott
By his Attorney Inventor
Richard M. Elliott

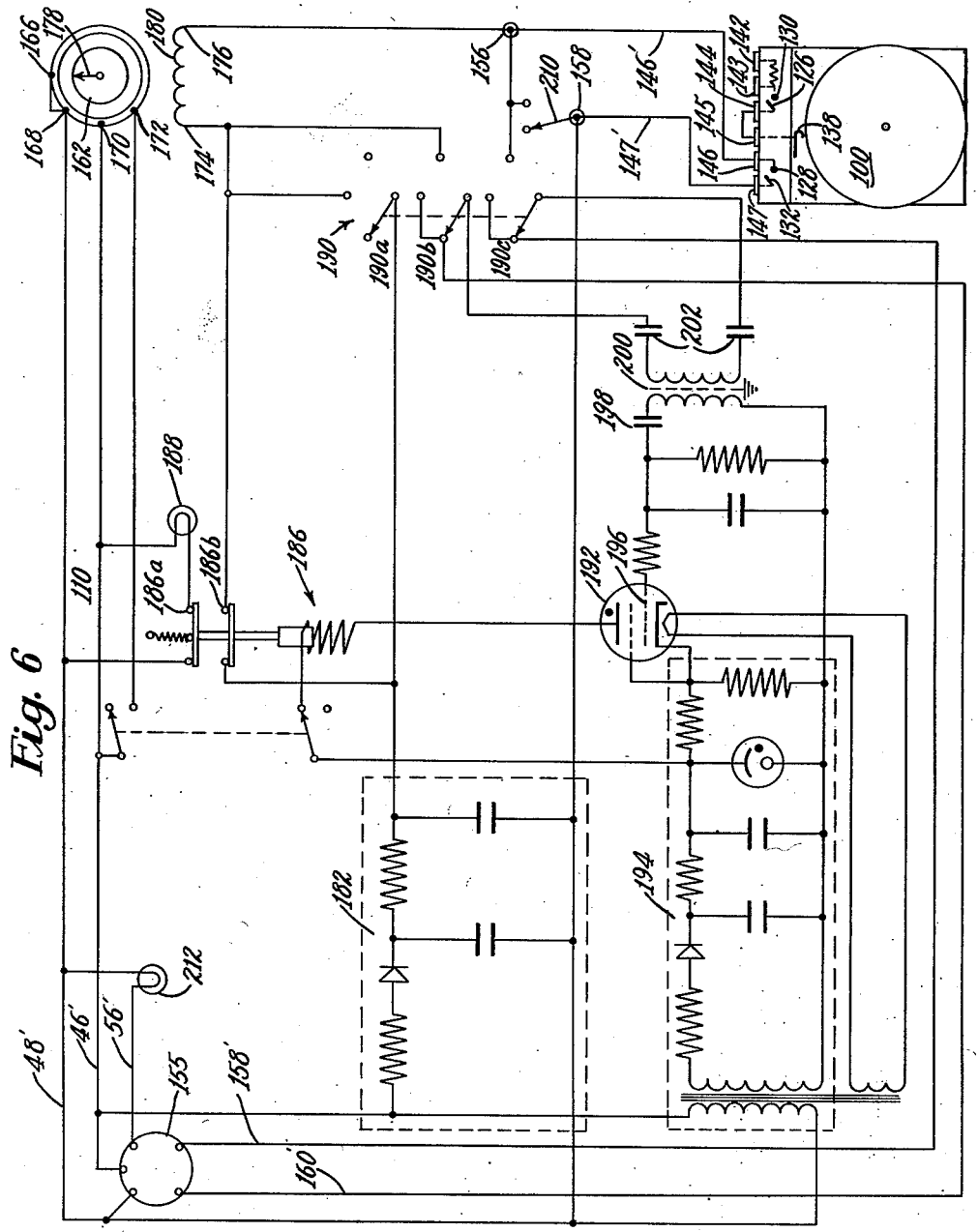

United States Patent Office 2,798,375
Patented July 9, 1957

2,798,375
APPARATUS FOR TESTING PRESSES

Richard M. Elliott, Beverly, Mass., assignor to United Shoe Machinery Corporation, Boston, Mass., a corporation of New Jersey Application July 25, 1955, Serial No. 524,186

5 Claims. (Cl. 73—1)

This invention relates to apparatus for testing presses and more particularly to apparatus for field testing cutting presses having certain types of controls to measure the performance of the presses and of their control functions and to detect any changes therein.

The invention is illustrated as embodied in apparatus adapted for testing a press of the type disclosed in United States application Serial No. 487,634, filed February 11, 1955, in the names of Frank E. Stratton and Fred T. MacKenzie.

This press comprises a work support, a movable platen, hydraulic means for moving the platen toward the work in a cutting stroke and away from the work support to return it to an initial position and a solenoid valve for controlling the hydraulic power means. The press also comprises an electronic stroke-terminating control system operative to deenergize the solenoid valve during a cutting stroke in response to the formation of an electric circuit of at least a predetermined conductivity between the platen and a conductive element of the work support. The hydraulic system is also provided with a pressure-operated switch operative to deenergize the solenoid valve in response to increase in the hydraulic pressure above a predetermined value.

The efficiency of the cutting press depends to a considerable extent upon the efficiency with which these controls operate and also upon the condition of the cutting surface and the dies which are used with the press. Since such cutting presses are commonly located in shoe factories distributed widely throughout the country, and are not readily transportable to a central location for testing, it is desirable that there be provided apparatus, conveniently light and portable, which may be used for field testing the operation of such machines and their controls.

Accordingly, it is an important object of the present invention to provide apparatus suitable for field testing machines of the above-described type, which apparatus is adapted for measuring the operating characteristics of their controls such as the speed of operation of the stroke-terminating control system, the over-travel of the platen during the operation of this system, and the operating pressure of the hydraulic pressure switch.

To this end and in accordance with a feature of the invention there is provided apparatus comprising a load cell and a timer. The load cell, designed to simulate the load of a cutting die on a work-piece, comprises two press-engaging members yieldingly supported in spaced relation by an element deformable in proportion to the compressive force applied to the members. A rod is mounted for frictional yielding movement through a bore in one member so that, when the members are moved toward each other beyond a predetermined amount by the pressure exerted by the press, one end of said rod is supported by the other member against further movement relative thereto, the rod and the member in which it is mounted then moving relative to each other. Upon release of the compression, the relative position of the rod and member is retained by the friction mounting of the rod and the displacement of the rod may be measured to determine the maximum pressure developed by the press during the stroke.

In accordance with another feature of the invention, the load cell is provided with contacts arranged for actuation by the rod for closure at the moment the rod is supported by said other member against movement relative thereto, said contacts providing a means for initiating the stroke-terminating control of the machine and a means for initiating the operation of a timer which constitutes another component of the testing apparatus. After closure of the contacts, further compression of the load cell produces relative movement between the rod and the member in which it is mounted so that the contacts open the instant the two members start to separate.

Other features and advantages of the apparatus may best be understood by the following description taken in connection with the accompanying drawings in which:

Fig. 2 is a plan view partly in section of the load cell illustrated in Fig. 1;

Fig. 3 is a partial section taken on the line III—III of Fig. 2;

Fig. 6 is a schematic of the timer illustrated in Fig. 1.

Figure 1:
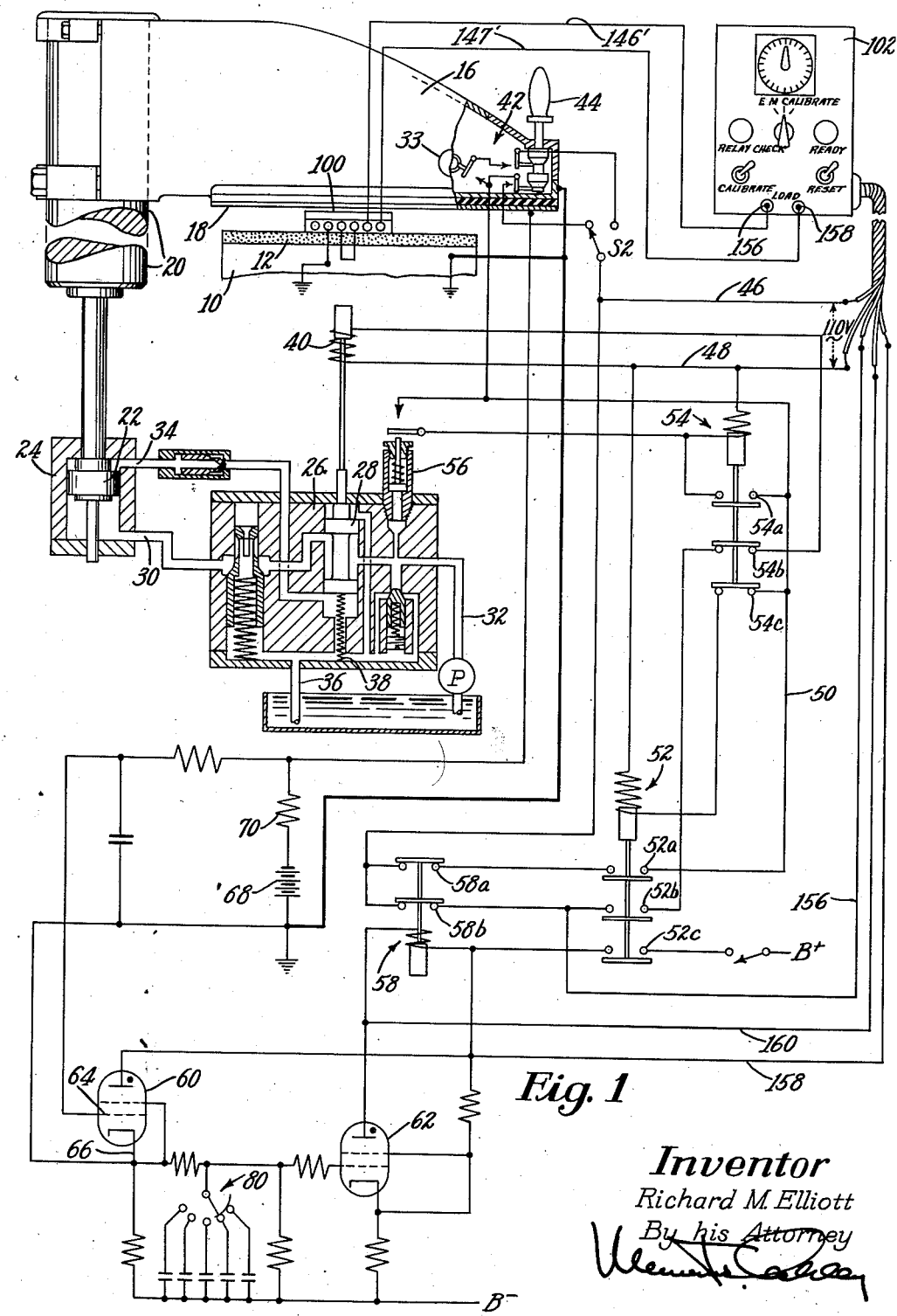
Fig. 1 is a diagrammatic representation of apparatus comprising a load cell and timer embodying the present invention as employed in a cutting press of the type described.
Figure 4:
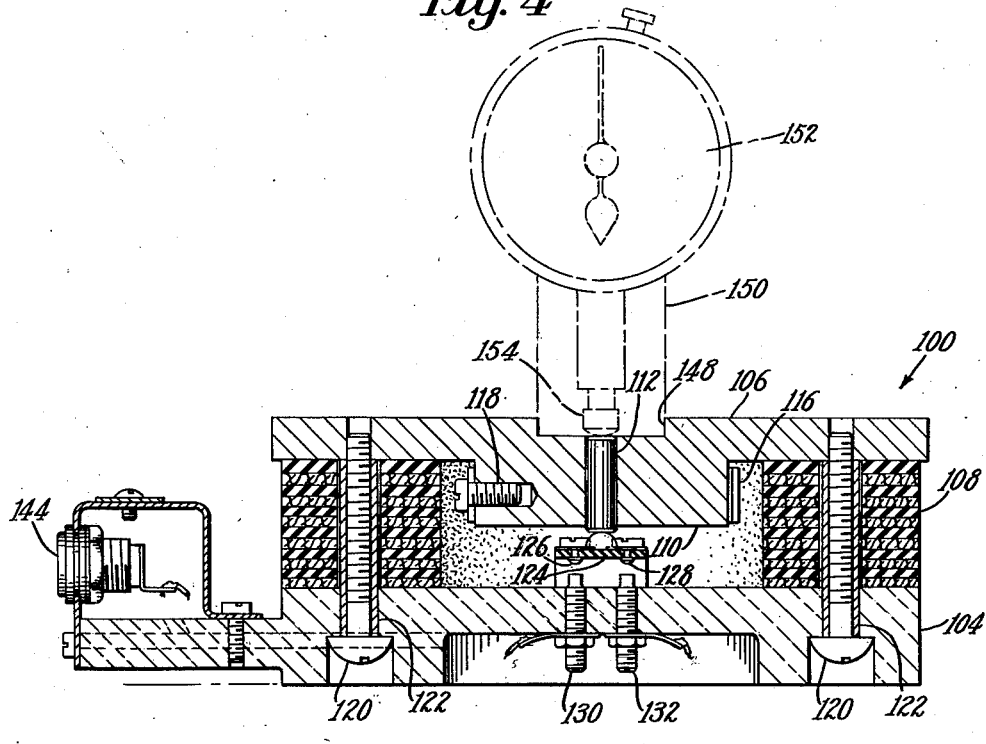
Fig. 4 is a section taken on line IV—IV of Fig. 2 and including in phantom a dial gage employed in making certain measurements on the load cell.
Figure 5:
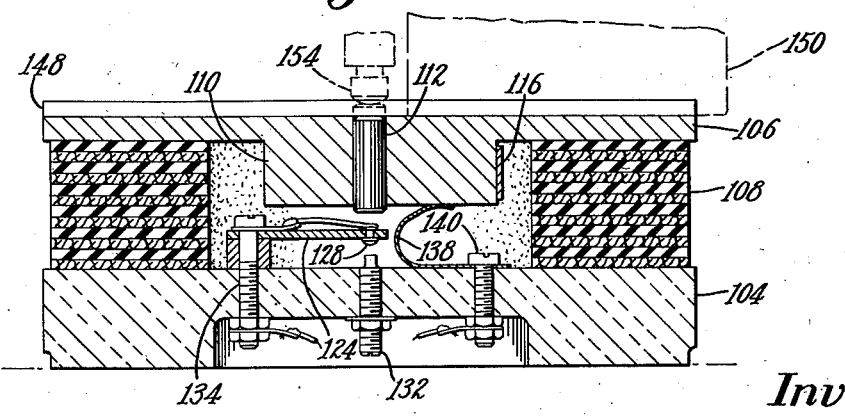
Fig. 5 is a section taken on line V—V of Fig. 2.

Referring to Fig. 1, the cutting press organization illustrated therein comprises a work support 10 including a conductive work support member 12, which may consist of conductive rubber, normally used in operation of the press for supporting work pieces of sheet material, such as leather, fabric or the like to be operated upon by a freely movable die to produce blanks. A platen or beam 16, including a metallic striking plate 18 providing a conductive platen member, is mounted upon a vertical post 20 at one side of the support 10 for swinging movement across it, the platen being arranged for reciprocation toward and away from the support. For safety reasons, the plate 18 is insulated from the rest of the platen as disclosed in a copending United States application Serial No. 481,683, filed January 13, 1955 in the names of Roy G. Ericson and Frank E. Stratton.

Power means for reciprocating the platen 16 are preferably fluid operated and are illustrated as comprising a piston 22 connected to the lower end of the post 20 and slidably mounted in a cylinder 24, the cylinder and the piston providing hydraulic power means for moving the platen 16 toward and away from the support 10. Control of the power means is provided by a valve 26 having an axially movable valve element 28. When the valve element 28 is in its upper position as shown, a lower port 30 in the cylinder 24 is connected to a supply pipe 32 and an upper port 34 is connected to an exhaust pipe 36 so that the piston 22 is urged upwardly. When the valve element 28 is in its lowermost position, the connections to the ports are reversed so that the piston is urged downwardly. The valve element 28 is normally biased upwardly by a spring 38 so that in its normal or rest position the platen is elevated. A solenoid 40 is arranged, by connection of its armature to the valve element 28, to move the element into its lowermost position when the solenoid is energized whereupon the platen is moved downwardly. The hydraulic system is more completely described in the aforesaid application Serial No. 487,634.

Manually operable stroke initiating means for controlling the hydraulic means to initiate a downward stroke of the platen 16 comprises a switch mechanism 42 operable to cause the solenoid 40 to be energized and having an operating handle 44 disposed at the front of the platen. In the illustrated position of a switch S2, downward movement of the handle 44 is effective to connect one line 46 of two A. C. supply lines 46, 48 to an intermediate conductor 50 and thence to the coil of a starting relay 52. The other position of the switch S2 provides for two-hand control wherein the handle 44 and a button 53 on the side of the platen must simultaneously be depressed to initiate a cutting stroke. The starting relay 52 has three normally open sets of contacts: one set 52a included in a holding circuit around the switch 42, a second set 52b included in the energizing circuit for the solenoid 40 originating at the line 46, and the third set 52c included in the plate voltage supply circuit of an electronic stroke terminating control.

An auxiliary relay 54 is connected for energization to deenergize the solenoid 40 and to break the holding circuit of the relay 52 upon the occurrence of over-pressure in the hydraulic system during energization of the relay 52. To this end a pressure switch 56 is series-connected between the conductor 50 and one side of the coil of the relay 54, and the relay 54 has three sets of contacts: normally open holding contacts 54a across the pressure switch 56, normally closed contacts 54b in the energizing circuit of the solenoid 40, and normally closed contacts 54c in the energizing and holding circuits of the relay 52.

The stroke terminating control, described in detail in application Serial No. 487,553, filed February 11, 1955, in the name of Robert W. Bradley, operates after initiation of the cutting stroke to terminate the downward movement of the beam when the die, in cutting through the work piece, completes a circuit of predetermined conductivity between the plate 18 and the support member 12. This control includes a relay 58 having two sets of normally closed contacts 58a and 58b connected respectively in the holding circuit around the switch 42 and in the energizing circuit of the solenoid 40. The relay 58 is connected for energization under the control of a two-stage relay circuit comprising two thyratrons 60 and 62, both thyratrons being normally biased non-conductive. The bias circuit for the thyratron 60 extends from its grid 64 to its cathode 66 through a bias battery 68 and a resistor 70. As described in the aforesaid application Serial No. 487,553, the support member 12 is connected to the cathode 66 while the striking plate 18 is connected to the upper end of the resistor 70 so that a circuit formed between the plate 18 and the member 12, as occurs when a cutting die passes through a work piece on the member 12, shunts the bias source and, when the resistance of the path becomes sufficiently low, causes the thyratron 60 to fire. The resulting positive voltage at the cathode 66 is transmitted through an adjustable time delay circuit 80 to the grid of the thyratron 62 which when fired energizes the relay 58 to deenergize the solenoid 40 causing return of the platen 16 to its upper position.

The apparatus embodying the present invention and which is designed to measure the operating characteristics of the above-described controls comprises a load cell 100, designed to simulate the load of a cutting operation, and a timer 102.

Referring to Figs. 2, 3, 4 and 5, the load cell 100 comprises a base member 104 formed of strong non-conductive material and a metallic cover member 106. Yieldingly supporting the members 104 and 106 in spaced relation is an element 108 which is deformable in proportion to the compressive force on the members and which may conveniently consist of an annulus of rubberized fabric. The cover member 106 has a circular contour and a portion 110 which is re-entrant within the cavity formed by the members and the element. A rod 112 is mounted in an axial bore through the member 106 for endwise movement relative thereto and is frictionally yieldably retained in position in the bore by engagement of one end of a pin 114 which extends radially of the portion 110 as best seen in Figs. 2 and 3. The friction pin 114 is urged inwardly by a wrap-around spring 116 one end of which is secured to the portion 110 by a screw 118 while the other end of the spring engages the outer end of the pin 114.

The base member 104, the cover member 106, and the deformable member 108 are assembled with screws 120 extending upwardly from the base 104 and making screw engagement with the member 106. The screws 120 are provided with sleeves 122 to provide smooth surfaces where the screws pass through the member 104 and the element 108 to facilitate sliding relative thereto when the load cell is compressed.

Supported on the base member 104 is a horizontal cantilever switch arm 124 of resilient non-conductive material carrying at its free end two electrical contacts 126 and 128 which are arranged to cooperate respectively with contacts 130 and 132 fixed in the base member 104. The free end of the switch arm 124 is directly in line with the rod 112 and the frictional retention provided by the pin 114 is adjusted so that movement of the member 106 toward the member 104 (causing compression of the element 108) will cause movement of the rod toward the base member 104 to engage the arm and close the contacts and thereafter will cause relative movement between the rod and the cover member 106 because of the support provided to the rod by the base member 104. The contacts on the arm 124 are electrically brought out through two screws 134 and 136 which support the arm. The contacts 130 and 132 are adapted to be adjusted heightwise so that pressure of the rod 112 on the arm closes the two sets of contacts substantially simultaneously. Provision is made for a connection to the cover member 106 by securing a leaf spring 138 to the base member 104 by a screw 140, the spring 138 being adapted resiliently to engage the cover member 106 at the bottom of the portion 110.

For connecting the load cell 100 to an external device or devices, six connectors 142, 143, 144, 145, 146, and 147 are arrayed across the front edge of the member 104. The connector 142 is connected to the connector 143 through a 500,000 ohm resistor (indicated diagrammatically in Figs. 2 and 6); the connector 143 is connected to the contact 130; the connector 144 is connected to the contact 126; the connector 145 is connected to the spring 138; the connector 146 is connected to the contact 128; and the connector 147 is connected to the contact 132.

The cover member 106 is formed with a diametrical groove 148 in its top surface adapted to receive a gage block 150 carrying a dial gage 152 having a probe 154. As is described hereinafter, the gage may be employed to measure the amount of relative movement of the rod 112 and the member 106 after a predetermined compression of the element 108 by the press and thereby measure the maximum pressure exerted by the press upon the cell.

Referring to Fig. 6, the timer 102 (Fig. 1) is provided with a connector receptacle 155 for connection of the timer to certain conductors of the circuits of the press as indicated in Fig. 6 by prime reference numerals corresponding to the reference numerals of said conductors as shown in Fig. 1. The timer also has terminals 156 and 158 adapted for connection to the connectors 146 and 147 of the load cell by leads 146' and 147'. In the timer is an electrically powered clock 162. The clock 162 has six terminals 166, 168, 170, 172, 174 and 176. Terminals 166 and 170 are connected within the clock to an electric driving motor which is arranged to drive the indicating pointer 178 of the clock through an electrically operated clutch 180 when the clutch is energized through terminals 174 and 176. The clock also has an electrically operated resetting device which is adapted upon energization of terminals 168 and 172 to return the pointer 178 to the zero position. During use of the test apparatus, the clock motor is connected to the lines 46' and 48' so that its motor is always running but is disengaged from the pointer 178. A half-wave rectifier and filter power supply 182 is provided for energizing the clutch 180 of the clock.

Connected in the timer circuit is a relay 186 having two sets of normally closed contacts 186a and 186b. The set 186a is connected across the power leads 46' and 48' in series with a pilot light 188 so that the light is illuminated when the relay 186 is deenergized. The positive terminal of the power supply 182 is connected to the terminal 174 of the clutch 180 by two paths, one path extending through the contacts 186b and the other path extending through the upper contacts 190a of a three-pole, three-position switch 190. The negative terminal of the power supply 182 is connected to the lead 147', and the lead 146' is connected to the terminal 176 of the clutch. Accordingly it will be seen that when the contacts 132 and 128 of the load cell are closed, the clutch 180 will be energized.

Means for energizing the relay 186 in response to the energization of the relay 58 (Fig. 1) is provided by the electronic circuit shown in the lower portion of Fig. 6. This circuit comprises a thyratron 192 having the relay 186 in its plate circuit and having a plate voltage supply 194. The thyratron 192 is normally maintained non-conductive by a negative bias provided by connecting its grid 196 to the negative terminal of the supply 194, while its cathode is connected to a voltage divider across the supply. The grid circuit is coupled through a capacitor 198 to the secondary of a transformer 200 whose primary is coupled through capacitors 202 to the lower contacts 190b and 190c of the switch 190. In the illustrative position of the switch 190 it will be seen that leads 158 and 160 of Fig. 1 are connected to the capacitors 202 and that accordingly when a sudden voltage appears across the relay 58, a positive voltage peak may be produced at the secondary of the transformer 200 to cause the thyratron 192 to fire, to open the contacts 186b, and stop the clock 162.

In the central position of the switch 190, the energization and de-energization of the clutch 180 are controlled entirely by the contacts 132, 128 of the load cell.

In the right-hand position of the switch 190, the timer circuit can be calibrated. In this position the contacts 190b and 190c connect the transformer 200 across the clutch so that when the latter is energized by the actuation of a calibration switch 210, the voltage across the clutch is also applied to the transformer to fire the thyratron 192 to open the contacts 186b.

In operation to test the electronic stroke-terminating control of the press, the load cell is placed on the cutting support 12 of the press and the connector 143 is connected to the frame of the machine. If the sensitivity of the electronic stroke-terminating control is also to be tested, the ground connection is made through the connector 142 instead of the connector 143, thus introducing 500,000 ohms into the bias-shunting circuit. The connectors 146 and 147 are connected to the corresponding leads 146' and 147' to the timer and the switch 190 positioned as shown in Fig. 6. The rod 112 is then positioned with its upper end flush with the horizontal surface of the groove 148 so that contacts of the cell will be closed at a predetermined load. The cutting stroke of the press is then started by depressing the handle 44. When the striking plate 18 of the press engages the cell 100, the member 106 is moved toward the member 104, causing the lower end of the rod 112 to engage the arm 124 and to move it downwardly to a position where the contacts are closed. At this moment several things happen. Relative movement begins between the rod 112 and the member 106, the "completion of cut" signal is transmitted to the electronic stroke-terminating control of the press by closure of one set of contacts, which provides a conductive path between the plate 18 and the support member 12 via the cell 100, and the clutch 180 of the timer is energized by closure of the other set of contacts which closes the circuit between leads 146' and 147'. Upon operation of the relay 58 of the aforesaid control, the clutch 180 is deenergized by the relay 186 to indicate the delay between the "completion of cut" signal and the energization of the relay 58, and the elevation of the rod 112 above the lower surface of the groove 148 may be measured to determine the extent of overtravel of, and the pressure built up by, the press. The momentary extinguishing of a check light 212 indicates that the contacts of the relay 58 have opened and that the stroke was not stopped by the pressure switch.

By moving the switch 190 to its central position, the time interval between the "completion of cut" signal and the actual reversal of the downward movement of the striking plate will be measured by the clock. If the pressure switch trips before the relay 58 is energized, the light 188 will remain lighted.

If it is desired merely to test the operating pressure of the hydraulic pressure switch, the load cell is placed in the press without making any connections to the connectors thereof. The press is then operated, and the cell will be compressed until such a load is built up that the pressure switch operates. The maximum load developed may be read by the displacement of the rod 112 as in the preceding cases.

Similarly, the cell may be used without the timer to check the operation of the electronic stroke-terminating control. In this test, either connector 142 or 143 is connected to the frame of the press and the press is operated. During compression of the load cell, the closure of contacts 126 and 130 will "trip" the control. The over-travel and the maximum load of the press may then be measured by the over-travel of the rod 112.

Having thus described my invention, what I claim as new and desire to secure by Letters Patent of the United States is:

1. Apparatus for testing presses having an electrically responsive stroke-terminating control comprising in combination, a first press-engaging member, a second press-engaging member, an element deformable in proportion to the compressive force applied to the members yieldingly supporting said members in spaced relation, a pair of normally open electrical contacts at least one of which is carried by the first of said members, means for connecting said contacts to such a control, and means carried by said second member to close said contacts for initiating the operation of said control upon a predetermined deformation of said element, said means being arranged for non-resilient yielding relative to said second member upon further such deformation for gaging the maximum pressure exerted by the press and its over-travel after operation of the control.

2. Apparatus for testing presses having an electrically responsive stroke-terminating control comprising, in combination, a first press-engaging member, a second press-engaging member, an element deformable in proportion to the compressive force applied to the members yieldingly supporting said members in spaced relation, a rod mounted through a bore in said first member for frictional yielding movement toward and away from said second member, a first electrical contact carried by said second member, a second electrical contact adapted to be carried by movement of said rod into engagement with said first contact at a predetermined pressure, means for connecting said contacts to such a control for initiating the operation of said control at said predetermined pressure, the mounting of the rod permitting relative movement of the rod and the first member during compression of the element after engagement of the contacts and hence permitting the maximum pressure to be subsequently determined.

3. Apparatus for testing presses having an electrically-operable stroke-terminating control comprising, in combination, first and second press-engaging members, an element deformable in proportion to the compressive force applied to the members yieldingly supporting said members in spaced relation, two sets of electrical contacts arranged to be closed substantially simultaneously by relative movement of said two members toward each other, an interval timer connected to one set of said contacts to initiate a timing interval upon closure of said one set, said timer being connected for termination of the interval upon the occurrence of a second predetermined event, and means for connecting the other set of contacts to said control to initiate its operation upon closure of said other set.

4. Apparatus for testing presses, comprising in combination, two press-engaging members, an element deformable in proportion to the compressive force applied to the members yieldingly supporting said members in spaced relation, an electrical contact carried by one of said members, a second contact, means carried by the other member for carrying said second contact into engagement with said first contact upon movement of said members toward each other to a predetermined distance, said means and said other member being connected for non-resilient relative movement upon further movement of the members toward each other, and an interval timer connected for control by said contacts to initiate a timing interval upon closure of the contacts said timer being connected for termination of the interval upon the occurrence of a second predetermined event.

5. Apparatus for testing presses, comprising in combination, a base member, a cover member, an element deformable in proportion to the compressive force applied to the members interposed between said members, a rod carried by said cover member and extending through a bore in the cover member for movement toward and away from the base member, means providing yieldable friction retention of the rod within said bore, a first pair of electrical contacts supported by said base member, a second pair of electrical contacts movable toward and away from said first pair and arranged to be moved into engagement with said first pair to form two closed sets by movement of said rod toward the base member during compression of the element, an interval timer connected for control by one set of said contacts to initiate a timing interval, said timer being connected for termination of the interval upon the occurrence of a second predetermined event, and means for connecting the other set to an electrically operated press control.

References Cited in the file of this patent
UNITED STATES PATENTS

| | | |
|---|---|---|
| 1,994,388 | Erichsen | Mar. 12, 1935 |
| 2,276,843 | Hathaway | Mar. 17, 1942 |
| 2,381,988 | Shortell | Aug. 14, 1945 |
| 2,591,255 | Hard af Segerstad et al. | Apr. 1, 1952 |
| 2,719,428 | Lambie | Oct. 4, 1955 |